United States Patent Office 3,381,017
Patented Apr. 30, 1968

3,381,017
PRODUCTION OF CARBINOLS EMPLOYING CYCLOPENTADIENYL OR LOWER ALKYL SUBSTITUTED CYCLOPENTADIENYL GRIGNARD REAGENTS AND HYDROGENATION
Thomas D. Waugh, Boulder, Colo., assignor, by mesne assignments, to Syntex Corporation, Panama, Panama, a corporation of Panama
No Drawing. Filed June 4, 1965, Ser. No. 461,512
14 Claims. (Cl. 260—297)

ABSTRACT OF THE DISCLOSURE

Preparation of cyclopentyl and cyclopentenyl carbinols from cyclopentadienyl Grignard reagents with a carbonyl compound followed by hydrogenation.

This invention relates to a novel method for the production of carbinols employing the use of cyclopentadienyl or lower alkyl substituted cyclopentadienyl Grignard reagents and hydrogenation techniques.

Prior to the present invention, cyclopentyl carbinols have been produced by the Grignard reaction of appropriate aldehydes and ketones with cyclopentyl Grignard reagents. In such reactions, where the carbonyl compound is an aldehyde, the carbinol resulting from the Grignard reaction is a secondary alcohol, while ketone reactants give tertiary alcohols. In general usage, Grignard reagents are written RMgX where R is an appropriate hydrocarbon radical and X is a halogen atom of bromine, chlorine or iodine. Thus, in the above referred to processes R of the Grignard reagent is the cyclopentyl group.

In general, the use of cyclopentyl Grignard reagents gives poor yields of the desired cyclopentyl carbinol. The one acceptable reaction is with formaldehyde, which is the first member of the aldehyde series and is almost invariably anomalous in its reactivity.

Objects and advantages of the invention will be set forth in part hereinafter and in part will be obvious herefrom, or may be learned by practice with the invention the same being realized and attained by means of the steps, methods and compositions pointed out in the appended claims.

The invention consists in the novel steps, methods and compositions herein shown and described.

It is an object of this invention to provide a novel method for the production of cyclopentyl carbinols in high yields.

Another object of this invention is to provide a novel method for the production of cyclopentyl carbinols in a simple and inexpensive manner.

A further object is to provide a novel method for the production of carbinols by the Grignard reaction employing cyclopentadienyl Grignard reagent.

It has been found that cyclopentyl carbinols may be produced in high yields by a two step process comprising (a) the Grignard reaction of an appropriate aldehyde or ketone with cyclopentadienyl Grignard reagent and (b) subsequent hydrogenation of the resulting Grignard reaction product to effect complete reduction of both double bonds of the cyclopentadienyl group to the cyclopentyl group.

From the discussion which follows it will be seen that much higher yields of the desired cyclopentyl carbinol are obtained by the process of this invention than are possible using the direct approach employing cyclopentyl Grignard reagent.

A further advantage of my process is that cyclopentadiene is available in the form of an easily depolymerizable dimer costing less than 20 cents a pound whereas cyclopentyl halides cost in the neighborhood of 5 to 7 dollars per pound. This makes the cyclopentadienyl Grignard much less expensive than the cyclopentyl Grignard.

In general, any of the carbonyl compounds in the form of aldehydes (mono or poly) including esters and acids containing an aldehyde group, or ketones (mono or poly), including keto-esters and keto-acids, that have heretofore been used as a reactant in the Grignard reaction to produce secondary and tertiary carbinols may be used as a reactant in the first stage (Grignard reactions) of my process. Typical examples of such carbonyl compounds are aliphatic aldehydes e.g. propionaldehyde; aryl aldehydes e.g. benzaldehyde; carbocyclic aldehydes, e.g. cyclohexyl aldehyde; heterocyclic aldehydes, e.g. pyridine-2-carboxyaldehyde; aliphatic ketones, e.g. acetone; aralkyl ketones, e.g. propiophenone; carbocyclic ketones, e.g. cyclohexanone; keto-ester, e.g. methyl phenylglyoxylate, etc.

The cyclopentadienyl Grignard reagent used in the first stage of applicant's process is a well known reagent. While it may be prepared by several different methods, because of convenience, I have prepared the reagent by an exchange reaction between cyclopentadiene and methyl and ethyl Grignards (Example A appearing hereinlater).

In carrying out the first stage of applicant's process, it is preferred that the aldehyde or ketone be added to the cyclopentadienyl Grignard because it is not only more convenient to run the reaction in that order, but also the reverse order of addition in a Grignard reaction sometimes leads to reduction or self-condensation rather than the desired product. Kharasch and Reinmuth discuss this point extensively in chapter 6 of their book, Grignard Reactions of Nonmetallic Substances, Prentice-Hall, 1954. So, to be on the safe side, it is preferable to add the aldehyde or ketone to the Grignard, though in some cases the reverse order of addition may work just as well.

In carrying out the reaction of cyclopentadienyl Grignard reagent with carbonyl compounds, the techniques normally employed in Grignard reactions with regard to temperature and solvents are used in my Grignard reaction. Accordingly, the temperature of the Grignard reaction is not very critical and the reaction may be carried out in the range —30° C. to 100° C. For operating reasons, it is preferred that the reaction temperature be in the order of 0° C. to 70° C. with the most preferred temperature range being 25° to 30° C. Below 0° C., it may be difficult to stir the reaction mixture and it is not economically feasible to operate above 70° C. since temperatures above 70° C. are not normally required in carrying out the reaction.

Any convenient solvent normally used in the Grignard reaction may be employed. It has been found convenient to use a toluene-ether solvent since such solvent system is used in the preparation of the cyclopentadienyl reagent. Other solvents or solvent systems could equally be employed, such as benzene-ether or xylene-ether solvents. If the cyclopentadienyl Grignard reagent is prepared in a manner different from that which I use, the reaction with carbonyl compounds and the reduction might be carried out in any of the solvents used in Grignard type reactions, such as ethyl, ether, tetrahydrofuran (THF), dibutyl ether, etc. The choice of preferred solvent depends to a great extent on the kind of compound being prepared since isolation by distillation would be the usual situation and a solvent would be chosen so that separation would be readily achieved.

As indicated hereinbefore, the reaction product of step 1 is then subjected to hydrogenation to reduce both of the double bonds of the cyclopentadienyl radical of the Grignard product to the cyclopentyl radical.

It is not usually necessary to isolate the cyclopentadienyl product (Grignard reaction product of step 1) before hydrogenation. In Example 7 of the specific examples appearing hereinlater, it will be noted that the reaction mixture was simply poured over ice in the hydrogenation vessel, the catalyst was added, and the reduction proceeded smoothly under mild conditions. If desired, the reaction mixture can be drowned into water or acid, and the organic material may be separated from the aqueous phase prior to hydrogenation. There are instances where this separation procedure can materially assist in the final isolation of the product, but it is not necessary for the reaction.

The hydrogenation step may be carried out at temperatures and pressures conventionally employed in hydrogenation reactions. For example, the pressure may be in the range of one atmosphere to several hundred. Excellent results have been obtained when the pressure is about 40 pounds; the reactions have proceeded well in this range and have been completed in a reasonable time. Some of the hydrogenations proceed so rapidly that a partial vacuum is produced in the reaction vessel. This is particularly true of larger scale runs where the feed rate of hydrogen to the reaction may not be rapid enough to keep up with the uptake of hydrogen, or where it is necessary to stop feeding hydrogen to cool the reaction, for example.

The temperature during the hydrogenation step does not appear to be critical. For example, a temperature in the range of 0° C. to 150° C. may be employed. Preferably, the hydrogenation is started at temperatures near 10° or 20° after which the temperature increases at will. The temperature may rise to 50° C. or so during the first rapid phase of the hydrogenation where the cyclopentenyl compounds are produced and then level off or even drop during the slower second phase of the reduction. On a large scale, cooling may be required to control the reaction. While temperatures as high as 150° C. and 100 lbs. of pressure have been used employing Raney nickel catalyst, in the usual procedure it has been sufficient to initiate the hydrogenation at about room temperature and 40 lbs. of hydrogen pressure and then raise the temperature to 40–60° C. at 40 lbs. pressure to complete the reaction.

The cyclopentadienyl Grignard reaction product is susceptible to a dimerization reaction, just as cyclopentadiene itself dimerizes to dicyclopentadiene. These intermediates do not all dimerize at the same rate, but it is desirable to keep them cold and initiate the hydrogenation without too much delay. Once the first double bond has been reduced and the cyclopentenyl stage has been reached, the compounds are quite stable and can be isolated and distilled if desired, as with methylcyclopentenylphenylglycolate of Example 11.

The following Example A illustrates the preparation of a cyclopentadienyl Grignard reagent used in accordance with the present invention.

EXAMPLE A

Preparation of Cyclopentadienylmagnesium bromide or chloride

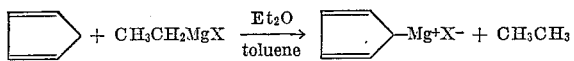

Procedure:

All the Grignards used in this work were made as described; however, other procedures are known.

A one liter, three-necked flask equipped with a stirrer, condenser and dropping funnel was well purged with gaseous nitrogen. To this flask was added 200 ml. of approximately 3.0 N ethylmagnesium bromide or chloride (about 0.6 mole) in ethyl ether solution. Ethyl ether was removed by distillation. When the pot temperature had increased to 60° C., addition of 100 ml. of toluene was started, and distillation was continued until all the toluene was in and the pot temperature had increased to 90° C. A mixture of 60 ml. of freshly cracked cyclopentadiene with 60 ml. of toluene was then added dropwise to the Grignard at a pot temperature of 90–100° C. over about 1 hour. A large amount of ethane was evolved, and the reaction was monitored by means of a gas bubbler. When the gas evolution had ceased, the reaction was considered complete. The mixture was then cooled to a temperature of 80° C. and 50 ml. of diethyl ether was added. A mixture of ether and excess cyclopentadiene was then distilled out to a pot temperature of 100° C. The finished Grignard was then cooled for use in further reactions.

Examples 1–9 which follow, illustrate the method of the present invention for the production of cyclopentyl carbinols employing a cyclopentadienyl Grignard reagent and an appropriate aldehyde or ketone, followed by full reduction, of both of the double bonds of the cyclopentadienyl group of the resulting Grignard reaction product. Example 10 illustrates the method of the present invention for the production of lower alkyl substituted cyclopentyl carbinols employing a lower alkyl substituted cyclopentadienyl Grignard reagent.

In the examples which follow, wherein the initial reactant for reaction with the Grignard reagent is an aldehyde, the final product of the Grignard reaction is a secondary alcohol; and, wherein the initial reactant of the Grignard reaction is a ketone, the resulting Grignard reaction product is a tertiary alcohol.

EXAMPLE 1

Preparation of ethylcyclopentyl carbinol

Propionaldehyde (35.5 g., 0.61 mole) mixed with 50 ml. of toluene was added over a period of 1 hour at 25–30° C. to a solution of cyclopentadienylmagnesium bromide (0.61 mole) in ether-toluene. The reaction mixture was allowed to stir 30 minutes at 30° C. and was then held at 20° C. for 6 hours. Following this period, the material was poured over 300 grams of ice and most of the organic layer was decanted off. The remaining magnesium salt slurry was extracted with 200 ml. of toluene and the toluene layer was again decanted off as completely as possible. To the slurry there was added 30 ml. of glacial acetic acid to dissolve most of the magnesium salts and the remaining organic material was separated and washed with dilute sodium carbonate solution.

The organic layers were combined and placed in a pressure hydrogenation apparatus along with 25 grams of water-wet Raney-nickel catalyst. Hydrogen was pressurized in to 80 p.s.i. The temperature rose from 22° C. to 34° C. over a period of 1 hour, then held steady while hydrogenation was continued for 10 hours. A small sample taken at this point showed about 3% unsaturated material remaining. The hydrogenation apparatus was pressured to 80 p.s.i. at room temperature and heated to 150° C. The pressure was now 150 p.s.i. This temperature was maintained for 15 hours. The apparatus was cooled and the organic material was filtered away from the catalyst. Solvents were removed through a fractionating column to 106° C. at about 630 mm. pressure. The remaining material was distilled at 15 mm. pressure. A first cut boiling to 72° C. was taken which weighed 19.1 g. and was 52% product.

A final cut was taken at 72–75° C. which weighed 39.4 g. and was 94% ethylcyclopentyl carbinol. The calculated yield based upon the propionaldehyde added was 59%. The product was identified by Infrared Spectroscopy and Gas-Liquid Chromatography.

EXAMPLE 2

Preparation of ethylcyclopentyl carbinol

Propionaldehyde (29.1 g. 0.50 mole), mixed with 20 ml. of toluene, was added dropwise over a period of 45 minutes in a temperature range of 25–30° C. to an ether-toluene solution of cyclopentadienylmagnesium bromide with good stirring. This mixture was stirred for 30 minutes at 30° C., then poured over 300 g. of ice. A thick slurry of magnesium salts resulted. Most of the organic layer was decanted from this slurry. The slurry was extracted with 200 ml. of toluene and again the organic layer was decanted away. Glacial acetic acid (30 ml.) was added to the slurry to dissolve most of the magnesium salts, and the remaining organic layer was separated and washed with 1% sodium bicarbonate solution.

The organic layers were combined and added to a pressure hydrogenation apparatus along with 3 g. of palladium-on-carbon catalyst. Hydrogen was pressured in to 40 p.s.i. and absorption was begun at 21° C. Hydrogen was absorbed rapidly and the temperature rose to 52° C. during the first 16 minutes of hydrogenation. The rate then slowed and hydrogenation was continued for 9 hours with the temperature slowly dropping. The temperature was increased to 60° C. and hydrogenation was complete in two hours.

The material in the hydrogenation apparatus was filtered, solvents were removed at 620 mm. of pressure, and the residue was fractionally distilled. A small forecut was taken (10.3 g.) from 106–172° which was 20% product. Two main fractions were collected. The first weighed 28.1 g., distilled at 172–173.5° C., and was 84% product. The second weighed 23.4 g., distilled at 173.5–175° C. and was 91% ethylcyclopentyl carbinol. Calculation from these values gives a yield of 73% based upon propionaldehyde.

A small sample was purified to give material for an Infrared Spectrum and a Refractive Index determination: $n_D^{25}$ 1.4550.

The material was identified by Infrared Spectroscopy and Gas-Liquid Chromatography.

EXAMPLE 3

Preparation of cyclopentylphenyl carbinol

Benzaldehyde (53.1 g., 0.50 mole) was added over a period of 33 minutes and in the temperature range of 25–30° C. to a solution of cyclopentadienylmagnesium bromide (0.61 mole) in toluene-ether. Stirring was continued following the addition for a further 30 minutes until no benzaldehyde could be detected.

The reaction mixture was transferred to a flask containing 300 grams of ice and 50 ml. of glacial acetic acid. The organic layer was separated and washed once with ice water. The organic layer was then placed in a pressure hydrogenation vessel along with 1.5 grams of 10% palladium-on-carbon catalyst.

Hydrogenation was begun at 20° C. at a pressure of 40 p.s.i. of hydrogen. A rapid uptake of hydrogen was observed along with a temperature rise to 36° C. in the first 45 minutes. The hydrogenation rate then began to fall. After 3½ hours of hydrogenation, the temperature was increased to 60° C. for 1⅓ hours. The material was removed from the hydrogenation apparatus, separated from the catalyst by filtration, washed once with 1% sodium carbonate solution and once with water. The solvents were removed in a rotating vacuum evaporator.

Distillation of the residue gave a product fraction boiling in the range of 91–105° C. at 1 mm. which was 85% pure. The yield of cyclopentylphenyl carbinol was 47%.

W. R. Edward, Jr., and E. Emmet Reid, JACS 52, 3235 (1930) reported a yield of 7% of "rather impure carbinol" by the reaction of cyclopentyl Grignard with benzaldehyde.

The product was identified by IR comparison with a material obtained by lithium aluminum hydride reduction of cyclopentylphenyl ketone prepared by a different synthetic route.

EXAMPLE 4

Preparation of 2-pyridylcyclopentyl carbinol

Pyridine-2-carboxaldehyde (53.5 g., 0.50 mole) was added over 20 minutes at 30–40° C. to an ether-toluene solution of cyclopentadienylmagnesium bromide (0.61 mole). The mixture was stirred for 4 hours at 30° C., then poured over 300 g. of ice. Glacial acetic acid (30 ml.) was added to dissolve the magnesium salts and the organic layer separated readily from the aqueous phase, which was still basic.

The organic phase was placed in a pressure hydrogenation apparatus along with 3.0 g. of 10% palladium-on-carbon catalyst. Hydrogen was fed in to a pressure of 40 p.s.i. Absorption was rapid for the first 16 minutes and was accompanied by a rise in temperature from 26° C. to 38° C. Hydrogenation continued for 1 hour at 38° C., and then the temperature was increased to 60° C. for 6½ hours. At the end of this time, hydrogenation was complete. The mixture was removed from the hydrogen apparatus, the catalyst was removed by filtration, and the filtrate was evaporated under vacuum to remove solvents.

The remaining material was distilled at 1 mm. pressure. A forecut of 7.6 g. was taken which contained 82% product. The main cut was made at 109–114° C. to give 54 grams of 2-pyridylcyclopentyl carbinol which was shown to be 97% pure by Gas-Liquid Chromatography.

This is a yield of 66% based on pyridine-2-carboxaldehyde. A molecular weight of 177 was obtained by potentiometric titration with perchloric acid in acetic, which agrees well with the calculated value of 177.2. The material was further identified by Infrared Spectroscopy. The Refractive Index of a highly purified sample was $n_D^{25}$ 1.5352.

EXAMPLE 5

Preparation of o-chlorophenylcyclopentyl carbinol

Cyclopentadienylmagnesium chloride (0.61 mole) was prepared in a toluene-ether mixture. To this was added 70.3 g. (0.5 mole) of o-chlorobenzaldehyde in 100 ml. of toluene over 60 minutes at 10° C. After stirring for a further hour at 10° C., the reaction mixture was drowned into a mixture of 800 g. ice and 60 ml. of concentrated hydrochloric acid. The organic layer was separated and washed twice with ice cold water and once with ice cold 1% sodium carbonate solution and refrigerated at 0° C. until hydrogenation could be accomplished.

To a flask was added 3 g. $PtO_2$ and 4 ml. acetic acid. The catalyst was prepared by absorption of hydrogen for 10 minutes. The cold organic mixture was added to the active catalyst and hydrogenation was begun at 10° C. and atmospheric pressure. The temperature was allowed to rise to 40° C. after two-thirds of the hydrogen had been added in 1 hour. The remainder of the hydrogen was added over 2 hours. After removal of catalyst by filtration the solution was washed with water and then with 1% sodium carbonate solution.

The solvents were removed by vacuum stripping to give 102.5 g. product which was 96.4% pure. This represents a yield of 95%. Distillation of this material at 135° C. at 6 mm. Hg gave a product which was 99+% pure.

EXAMPLE 6

Preparation of dimethylcyclopentyl carbinol

Acetone (34.8 g., 0.60 mole) mixed with 50 ml. of toluene was added over 65 minutes at 25–30° C. to an ether-toluene slurry of cyclopentadienyl-magnesium chloride. The mixture was stirred at room temperature for 35 minutes, then allowed to stand for 30 minutes. The material was then poured over about 300 g. ice.

After removal of the magnesium salt, the organic phase was placed in a pressure hydrogenation apparatus, and 1.5 g. of 10% palladium-on-carbon catalyst was added. Hydrogen was fed into the stirred organic material at 40 p.s.i. The temperature increased very rapidly to 51.5° C. during the first 30 minutes, and a very rapid absorption of hydrogen was observed. Hydrogenation was continued at 80 p.s.i. and 56° C. for a further 4 hours and was complete at the end of this time.

After removal of catalyst, the product was recovered by fractional distillation. The solvent fraction contained a small amount of product which was not included in the yield calculations. Two fractions were taken. The first distilled at 106–160° C. at 630 mm. Hg and weighed 66.7 g. It was 37% product. The second fraction distilled at 160–172° C. at 630 mm. Hg and weighed 50.3 g. It was 9.3% product. The yield was 93% based upon acetone added.

The Refractive Index of a purified sample was $n_D^{25}$ 1.4560 compared with a value of 1.4567 given by Skinner and Florentine, JACS 76,3200 (1954), and the Infrared Spectrum was similar to that of the spectra of similar compounds.

EXAMPLE 7

Preparation of ethylcyclopentylphenyl carbinol

Propiophenone (67.1 g., 0.50 mole) was added over 1 hour at 25–30° C. to a toluene-ether solution of cyclopentadienylmagnesium bromide (0.61 mole). Stirring was continued for 20 minutes. The mixture was then held for 18 hours at room temperature. The material was transferred to a pressure hydrogenation apparatus and 300 g. of ice and 3.0 g. of 10% palladium-on-carbon were added. The mixture was hydrogenated at 40 p.s.i. of hydrogen. The temperature rose from 10° C. to 29° C. during the first 55 minutes of hydrogenation and remained there for 5 more hours. The temperature was then increased to 55° C. and hydrogenation was completed during a final 4 hours. The material was removed from the hydrogenation apparatus, separated from magnesium salts and catalyst by filtration, and the aqueous layer was separated and discarded. Solvents were removed from the crude product in a rotating vacuum evaporator.

Distillation of the crude material at 1 mm. pressure gave a main fraction of 90 grams, boiling at 118–122° C. and 1 mm. of pressure which was 94% pure by Gas-Liquid Chromatography. The yield, based on propionphenone, was 83%.

The material was identified by Infrared Spectroscopy and Gas-Liquid Chromatography.

A sample was purified by Gas-Liquid Chromatography and exhibited a refractive index of $n_D^{25}$ 1.5280.

EXAMPLE 8

Preparation of 1-cyclopentylcyclohexanol

Cyclohexanone (49.1 g., 0.50 mole) was added dropwise over a period of 1 hour at 25–30° C. to a solution of cyclopentadienylmagnesium bromide (0.61 mole) in ether-toluene. The material was stirred for 3 hours at 30° C. and then poured over 300 g. of ice. After addition of 30 ml. of acetic acid the aqueous layer was separated and extracted with 200 ml. of toluene. The combined organic layers were placed in a pressure hydrogenation apparatus along with 3.0 g. of 10% palladium-on-carbon catalyst, and the apparatus was pressured with hydrogen to 40 p.s.i. The temperature rose from 25° C. to 46° C. in the first 18 minutes of hydrogenation, then slowly dropped to 41° C. during a further 20 minutes. The temperature was increased to 60–74° C. for 5 hours in order to complete the hydrogenation. The material was filtered, solvents were distilled off in a rotary vacuum evaporator, and the product was recovered by distillation.

A fraction weighing 46.1 g. and boiling at 106–118° C. at 18 mm. Hg was collected and was 93% 1-cyclopentylcyclohexanol. The yield was 58%. The material had a setting point of 64.5° C. A 5 g. portion of this material was recrystallized from ligroin and had a M.P. of 67.5–69° C. This previously unreported material was identified by Infrared Spectroscopy and Gas-Liquid Chromatography.

EXAMPLE 9

Preparation of methyl cyclopentylphenylglycolate

To a slurry of 0.319 lb. mole of cyclopentadienylmagnesium bromide in a mixture of toluene-ether was added 43 lb. (0.262 lb. mole) of methyl phenylglyoxalate in 47 lb. of toluene over 43 minutes at 23° C. with cooling. The reaction mixture was stirred 15 minutes at 21–23° C. and was then drowned into 160 lb. of ice and 31.6 lb. of acetic acid.

The product-containing organic layer was separated from the aqueous phase and washed twice with water. Ether was distilled off under vacuum to 35° C. and 90 mm. of Hg and 117 lb. of methanol and 1.4 lb. of acetic acid was added. The residue was transferred to a hydrogenation vessel containing 940 g. of 10% palladium metal catalyst on charcoal and 2000 g. of water.

Hydrogenation was started at 20° C. and a hydrogen pressure of 40 p.s.i.g. Cooling was used to hold the temperature at 25° C. for 470 minutes after which time the temperature was increased to 60° C. and held for an additional 215 minutes. A sample showed about 0.1% unsaturated material.

The catalyst was removed by filtration, and solvents were removed by distillation to a temperature of 110° C. at 9 mm. of Hg. Fractionation of the remaining material at 152° C. and 6 mm. Hg gave 52.7 lb. of product; a yield of 86% based on methyl phenylglyoxalate.

The product was found to be 98% pure.

EXAMPLE 10

Preparation of ethyl(methylcyclopentyl) carbinol

An ether-toluene solution of methylcyclopentadienylmagnesium bromide was prepared in the manner previously described for cyclopentadienylmagnesium bromide except that methylcyclopentadiene was substituted for cyclopentadiene.

Propionaldehyde (29.1 g., 0.50 mole), mixed with 80 ml. of ether was added dropwise over a period of 30 minutes in a temperature range of 25–30° C. to an ether-toluene solution of methylcyclopentadienylmagnesium bromide (0.55 mole) with good stirring. This mixture was stirred for 30 minutes at 30° C., then poured over 300 g. of ice. A thick slurry of magnesium salts resulted. Most of the organic layer was decanted from this slurry. The slurry was extracted with 200 ml. of toluene and again the organic layer was decanted away. Glacial acetic acid (30 ml.) was added to the slurry to dissolve most of the magnesium salts, and the remaining organic layer was separated and washed with 1% sodium bicarbonate solution.

The organic layers were combined and added to a pressure hydrogenation apparatus along with 3 g. of palladium-on-carbon catalyst. Hydrogen was pressured in to 40 p.s.i. and absorption was begun at 24° C. Hydrogen was absorbed rapidly and the temperature rose to 60° C. during the first 20 minutes of hydrogenation. The rate then slowed and hydrogenation was continued for 4 hours at 60–70° C.

The hydrogenated material was then filtered and the product was separated from the solvents by fractional distillation through a packed column at a pressure of about 630 mm. Hg. The first fraction (13 g.) distilled at 106°–183° C. and was 33% product. The second fraction (43.4 g.) distilled at 183°–186° C. and was 91% product.

Distillation of the residue at 1 mm. Hg and 70° C. gave a final fraction (8.8 g.) which was 94% product. Calculation from these values shows a yield of 68% based upon propionaldehyde.

The material was identified by Infrared Spectroscopy and Gas-Liquid Chromatography.

As indicated hereinbefore, the two-stage process of the present invention results in the production of cyclopentyl carbinols in high yields. In order to compare the results obtained with the prior art processes employing a cyclopentyl Grignard reagent, there is provided in Table I a summary of the yields obtained by the Grignard reaction of cyclopentyl Grignard reagents with a number of carbonyl compounds as reported by Kharasch and Reinmuth in their book, Grignard Reactions of Non-Metallic Substances, Prentice-Hall, 1954.

TABLE I

Examples using cyclopentyl Grignards:

In examples, R = [S*>]– , [S*>]–MgX where X=Br, Cl

| Aldehyde or ketone | Product | Yield, Percent | Page No. |
|---|---|---|---|
| (1) $CH_3CH_2 \cdot CHO$ | $+ RMgBr \longrightarrow CH_3CH_2\text{—}\underset{R}{CHOH}$ | 19.5 | 256 |
| (2) $C_6H_5CHO$ | $+ RMgBr \longrightarrow C_6H_5\underset{R}{CHOH}$ | 7 | 273 |
| (3) $CH_3\text{—}\overset{O}{\underset{\|}{C}}\text{—}CH_3$ | $+ RMgBr \longrightarrow CH_3\text{—}\underset{R}{\overset{OH}{C}}\text{—}CH_3$ + [S*>]=CH₂ | Aggregating 45% Apparently not separated | 313 |

*S denotes complete saturation.

From the results reported in Table I and those of the invention as described hereinbefore in the working examples, it is seen that the process of the present invention gives unexpected yields in the amount of cyclopentyl carbinol that is produced. For example, by the prior art process the yield of cyclopentyl phenyl carbinol from the Grignard reaction employing benzaldehyde is 7% compared to the yield of 47% obtained in Example 3 of the present specification.

In the preceding Examples 1–10 the cyclopentadienyl group is subjected to a complete hydrogenation. In other words, both of the double bonds of the cyclopentadienyl or lower alkyl substituted cyclopentadienyl group have been reduced so that the resulting product is a cyclopentyl or lower alkyl substituted carbinol. As shown by Example 11 which follows, however, it is possible to control the hydrogenation so that the cyclopentadienyl group is only partially reduced resulting in the production of cyclopentenyl carbinol.

EXAMPLE 11

Preparation of methyl cyclopentenylphenylclycolate

A mixture of 119 g. of methyl phenylglyoxylate, 130 g. toluene, and 50 g. ether was added to a solution of cyclopentadienylmagnesium bromide (0.9 mole) in a mixture of ether and toluene at a temperature of 20–25° C. over a period of 15 minutes. The reaction mixture was stirred 15 minutes at 25° C. and then added to a mixture of 87 g. of acetic acid and 450 g. of ice. The water layer was drawn off and the organic layer was washed with 2 portions of water. The volatile components of the organic layer were removed by vacuum distillation to a pot temperature of 35° C. at 10 mm. pressure.

The toluene solution of methyl cyclopentadienylphenylglycolate was added to 750 ml. of ethyl acetate containing 25 g. of zinc-deactivated palladium catalyst [1] and the mixture was hydrogenated for 2 hours under a hydrogen pressure of 50 lb. at 25–30° C.

After the hydrogenation was complete, the catalyst was separated by filtration, and the product was distilled at a pressure of 1 mm. to give 105 g. of crude product which boiled between 100° and 165° C. Upon redistillation of the crude product at 1 mm. approximately 56 g. of product was collected boiling in the range from 123° to 144° C.

Analysis of this product gave an equivalent weight of 232 based on unsaturation and an equivalent weight of 226 based on saponification. It is, therefore, a mixture of methyl cyclopentenylphenylglycolates.

---
[1] Belg. Patent 617,779 to BASF (C.A. 59, 480c).

The carbinols produced in accordance with the process of the present invention are useful as intermediates in the production of compounds for pharmacological use.

The invention in its broader aspects is not limited to the specific steps, methods and compositions described but departures may be made therefrom within the scope of the accompanying claims without departing from the principles of the invention and without sacrificing its chief advantages.

What is claimed is:

1. A two-step process for the production of cyclopentyl or lower alkyl substituted cyclopentyl carbinols comprising: (a) effecting a Grignard reaction of an appropriate carbonyl compound selected from the group consisting of lower aliphatic aldehydes and ketones, lower cycloaliphatic aldehydes and ketones, monocarbocyclic-aryl aldehydes and ketones, monoheterocyclic-aryl aldehydes and ketones, lower aliphatic keto esters and monocarbocyclic-aryl keto esters with a cyclopentadienyl or lower alkyl substituted cyclopentadienyl Grignard reagent; and (b) subjecting the resulting cyclopentadienyl or lower alkyl substituted cyclopentadienyl Grignard reaction product to hydrogenation to reduce both of the double bonds of the cyclopentadienyl or lower alkyl substituted cyclopentadienyl group of said Grignard reaction product.

2. A process according to claim 1 wherein the carbonyl compound is an aldehyde and wherein the resulting cyclopentyl carbinol is a secondary alcohol.

3. A process according to claim 1 wherein the carbonyl compound is a ketone and wherein the resulting cyclopentyl carbinol is a tertiary alcohol.

4. A process according to claim 1 wherein the Grignard reagent is a lower alkyl substituted cyclopentadienyl Grignard reagent.

5. A process according to claim 1 wherein the Grignard reagent is methylcyclopentadienyl Grignard reagent, the carbonyl compound is propionaldehyde and the resulting lower alkyl substituted cyclopentyl carbinol is ethyl(methylcyclopentyl) carbinol.

6. A process according to claim 1 wherein the Grignard reagent is cyclopentadienyl Grignard reagent.

7. A process according to claim 6 wherein the carbonyl compound is propionaldehyde and the resulting cyclopentyl carbinol is ethylcyclopentyl carbinol.

8. A process according to claim 6 wherein the carbonyl compound is pyridine-2-carboxaldehyde and the resulting cyclopentyl carbinol is 2-pyridylcyclopentyl carbinol.

9. A process according to claim 6 wherein the carbonyl compound is o-chlorobenzaldehyde and the resulting cyclopentyl carbinol is o-chlorophenylcyclopentyl carbinol.

10. A process according to claim 6 wherein the carbonyl compound is acetone and the resulting cyclopentyl carbinol is dimethylcyclopentyl carbinol.

11. A process according to claim 6 wherein the carbonyl compound is methyl phenylglyoxalate and the resulting cyclopentyl carbinol is methyl cyclopentylphenyl glycolate.

12. A two-stage process for the production of cyclopentenyl or lower alkyl substituted cyclopentenyl carbinols comprising: (a) effecting a Grignard reaction of appropriate carbonyl compounds selected from the group consisting of lower aliphatic aldehydes and ketones, lower cycloaliphatic aldehydes and ketones, monocarbocyclicarly aldehydes and ketones, monoheterocyclic-aryl aldehydes and ketones, lower aliphatic keto esters and monocarbocyclic-aryl keto esters with a cyclopentadienyl or lower alkyl substituted cyclopentadienyl Grignard reagent; and (b) subjecting the resulting Grignard reaction product to hydrogenation to reduce one of the double bonds of the cyclopentadienyl or lower alkyl substituted cyclopentadienyl group of said Grignard reaction product.

13. A process according to claim 12 wherein the Grignard reagent is cyclopentadienyl Grignard reagent.

14. A process according to claim 13 wherein the carbonyl compound is methyl phenylglyoxalate and the resulting cyclopentyl carbinol is methyl cyclopentenylphenylglycolate.

References Cited

UNITED STATES PATENTS

| | | | |
|---|---|---|---|
| 2,921,940 | 11/1955 | Ramsden | 260—297 |
| 2,995,492 | 8/1961 | Biel | 167—65 |
| 2,993,900 | 7/1961 | Biel | 260—268 |
| 3,222,399 | 12/1965 | Faust et al. | 260—570.5 |
| 2,832,786 | 4/1958 | Tilford et al. | 260—294.7 |
| 2,662,891 | 1/1948 | Sperber et al. | 260—296 |

FOREIGN PATENTS 897,251   5/1962   Great Britain.

OTHER REFERENCES

Chem. Abstracts, vol. 51, par. 11259 (1957).

Adkins, Reactions of Hydrogen, Univ. Wisconsin Press, 4th printing (1946), p. 138.

Kharasch et al., Grignard Reactions of Non-Metallic Substances, Prentice-Hall, New York (1954), pp. 138–141.

Palazzo et al., J. Med. and Pharm. Chem., vol. 4, No. 3, pp. 447–456 (1961).

JOHN D. RANDOLPH, *Primary Examiner.*

WALTER A. MODANCE, *Examiner.*

A. L. ROTMAN, *Assistant Examiner.*